Jan. 6, 1925.

M. GILGENBERG

WOOD SCREW CUTTING MACHINE

Filed Oct. 7, 1921

Inventor
Martin Gilgenberg,
by H. B. Willson & Co,
Attorneys

Jan. 6, 1925. 1,521,939
M. GILGENBERG
WOOD SCREW CUTTING MACHINE
Filed Oct. 7, 1921 3 Sheets-Sheet 2
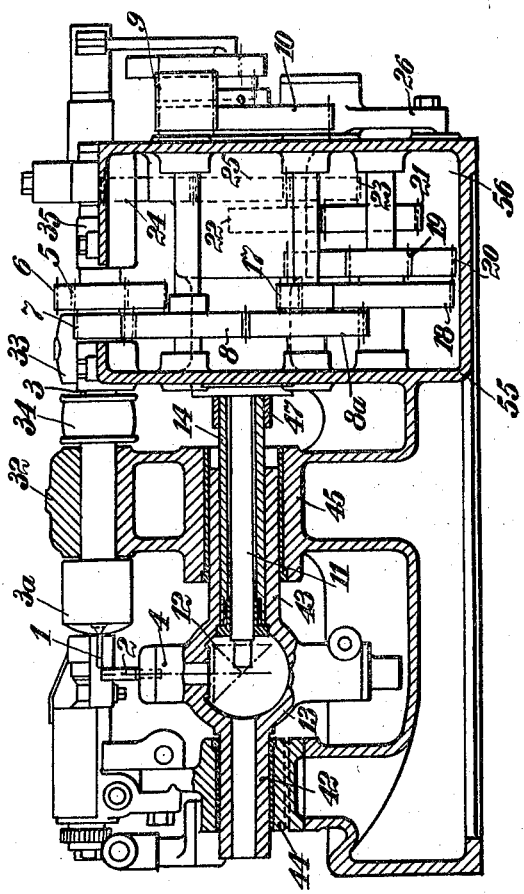
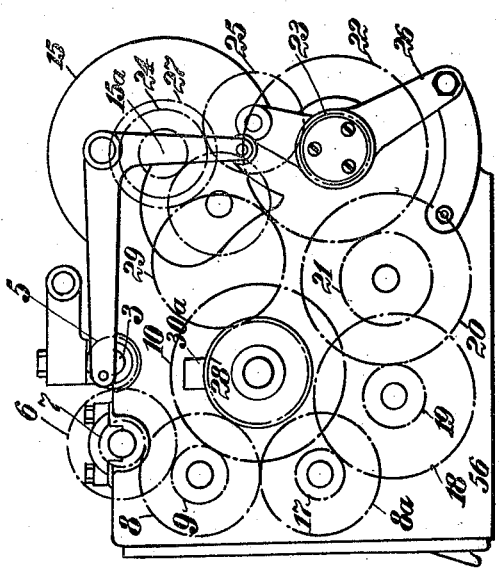
Inventor
Martin Gilgenberg
by
H. B. Willson & Co.
Attorneys Inventor
Martin Gilgenberg
by H. B. Willson & Co.
Attorneys Patented Jan. 6, 1925.

1,521,939

UNITED STATES PATENT OFFICE.

MARTIN GILGENBERG, OF COLOGNE-ON-THE-RHINE, GERMANY, ASSIGNOR TO EIKAR G. M. B. H., MASCHINEN-UND WERKZEUGFABRIK, OF BRAUNSFELD, NEAR COLOGNE-ON-THE-RHINE, GERMANY.

WOOD-SCREW-CUTTING MACHINE.

Application filed October 7, 1921. Serial No. 506,111.

*To all whom it may concern:*

Be it known that I, MARTIN GILGENBERG, citizen of Germany, residing at Cologne-on-the-Rhine, Germany, have invented new and useful Improvements in Wood-Screw-Cutting Machines, of which the following is a specification.

This invention relates to improvements in wood screw cutting machines, and refers particularly to machines for this purpose of the type in which screws of any desired pitch and length of thread may be cut without changing the gear ratio between the work spindle and the cutter spindle.

The object of the invention is to provide an improved wood screw cutting machine of this type in which there is employed an improved form of gearing which is extremely simple and compact, and the invention depends upon the discovery made through extensive experiments and calculations that it is possible to produce all the usual types of wood screw in a machine which has always the same ratio of transmission for the gear system between the work spindle and the cutter spindle and the same number of cutter teeth, provided the number of revolutions of the cutter spindle is selected in accordance with the type of screw to be cut, so that the cutter shaft makes the correct number of revolutions required for the production of the screw in question. In this connection the following ratio has been found:—

If S designates the pitch and L the length of the thread of a wood-screw to be cut, X the normal ratio of transmission for the gear system between the work spindle and the cutter spindle and Z the constant number of cutter teeth, the required number of revolutions $n$ for the cutter spindle for the cutting of any desired form of wood-screw can be calculated from the following formula:

$$n = \frac{6 \times L}{(Z-X) \times 5 \times S}.$$

The corresponding number of revolutions $n'$ for the work spindle is calculated from the formula:

$$n' = Z \times n - \frac{6 \times L}{5 \times S}.$$

The present invention comprises a machine for the production of wood-screws according to this method, in which owing to the retaining of the same improved form of transmission gear between the work spindle and the cutter spindle for all lengths and pitches of threads to be produced it is possible to arrange the gearing very compactly in one bearing assembly of the machine and to obtain thus a shortening and simplification of the machine, with a corresponding reduction in the cost of manufacture. Further, the gears which serve for driving the control shaft for the opening and closing of the jaws holding the work piece can be compactly arranged in this machine in the bearing assembly by which further simplification is obtained. This control shaft serves at the same time for driving the cam whose stroke determines the length of the thread. In machines of the old type the cam was driven by means external to the machine.

Further features of the new machine according to the present invention will be obvious from the following detailed description and the claims.

One preferred embodiment of the new machine is illustrated by way of example in the accompanying drawings:—

Figure 3 shows an end view of such a machine, all the transmission gears being indicated.

Figure 4 is a side elevation of the machine partly in section.

Figure 1:
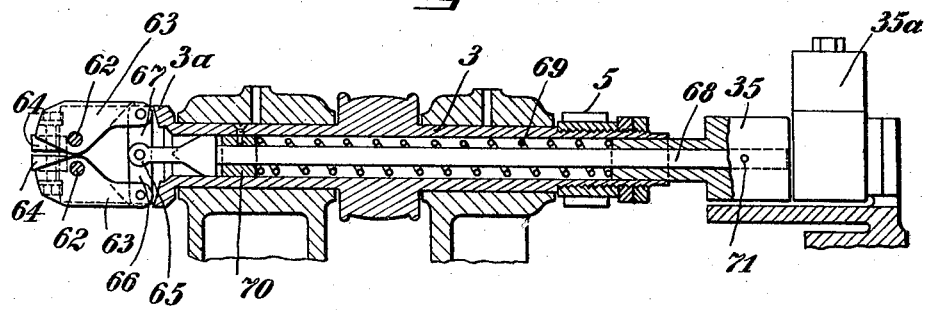
Figure 1 shows a detail view of the work spindle in section with the jaws for holding the work piece.
Figure 2:
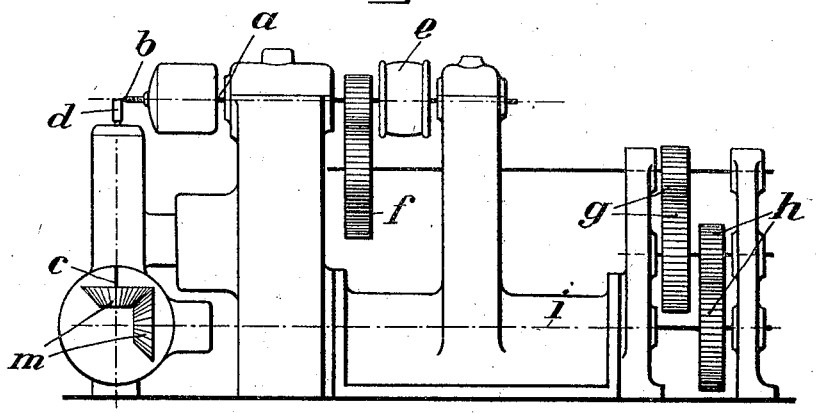
Figure 2 illustrates the mounting of the gear system for a machine in accordance with my invention.
Figure 7:
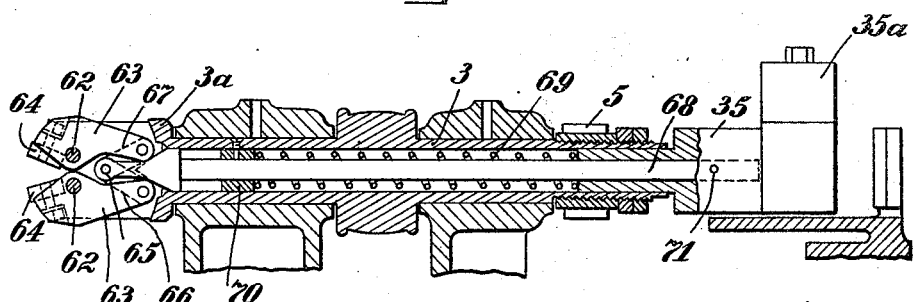
Figure 7 is a detail view of the work spindle in section in accordance to Fig. 1, with the jaws opened.

In Figure 2 $a$ designates the working shaft driven from the belt pulley $e$ and upon which the work piece $b$ is mounted; $c$ designates the cutter shaft with the cutter $d$. With the aid of the gears $f$, $g$, $h$ the rotation is transferred over the auxiliary shaft $i$ to the pair of bevel gears $m$, one of which is keyed upon the cutter shaft $c$. According to the screw types to be cut the ratio of transmission between all these gear wheels had to be altered in the old system.

When my improved method is applied, where this ratio of transmission is always the same and a very simple one, a much smaller number of gear wheels is sufficient than in the old system, for transferring the rotation of the working shaft $a$ to the cutter shaft $c$. Herefrom results a considerable simplification of the construction of the machine and a considerable reduction of the cost of manufacture, the machine becoming of more compact construction.

Figure 5:
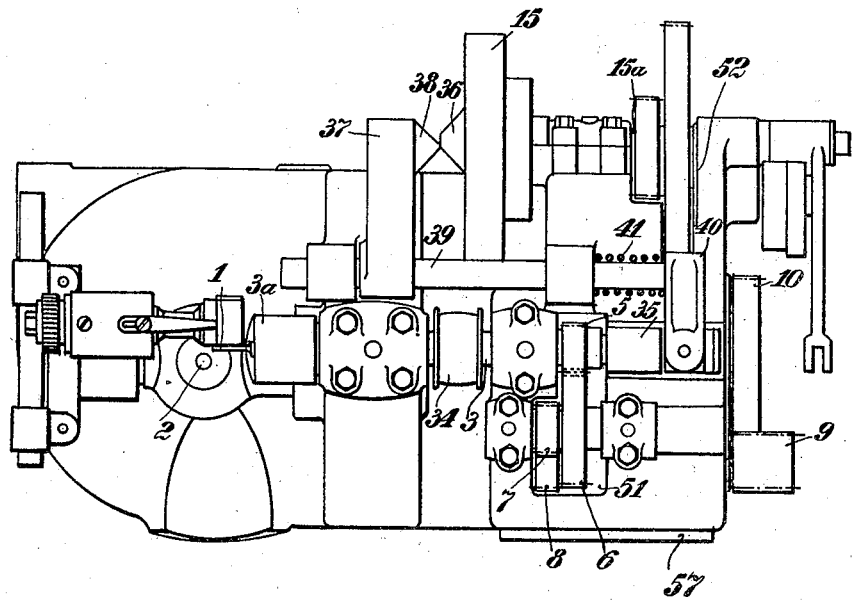
Figure 5 is a plan view.

Referring now to Figs. 1 and 3 to 7, the work piece or blank 1 upon which the screw thread is to be cut by the usual rotating cutter 2 is held in the well known manner by a chuck $3^a$ which is mounted at the front end of the work spindle 3. This shaft 3 is journalled at 32 and 33 and is driven from the belt pulley 34. The chuck $3^a$ contains two jaws 64 (Figs. 1 and 7) arranged on levers 63 that are pivotally connected to the chuck body at 62. The rearward end of both said levers 63 are pivotally connected by links 66 and 67 with the end 65 of a rod 68 which is slidably arranged in the hollow shaft 3. A reciprocating bush 35 with head $35^a$ is fixed by a pin 71 to the rearward end of rod 68. Between this bush 35 and a ring 70 fixed to the hollow shaft 3 a spring 69 is arranged which tends to press bush 35 rearward to the right and thereby to hold the jaws 64 closed and the levers 63 and links 66—67 in the position shown in Fig. 1. This arrangement is a well known conventional construction. The opening and closing of the chuck $3^a$ is effected by the reciprocating bush 35 which is operated from the control shaft $15^a$ (Fig. 5). A cam disk 15 with an eccentrically arranged cam 36 is mounted upon the shaft $15^a$. This cam 36 is adapted to engage the cam 38 which is arranged facing the cam 36 upon an arm 37. In the movement of the cam the arm 37 draws along the rod 39 upon which it is mounted, and also an arm 40 which is mounted upon this rod 39. This arm 40 engages the bush 35 behind its head $35^a$ in such a manner that when the arm 40 is drawn to the left, bush 35 is also pushed to the left and rod 68 (Fig. 1) with it. Thereby, the links 66—67 and levers 63 are turned from the position shown in Fig. 1 to that shown in Fig. 7, the jaws 64 being opened thereby. The spring 41 which encircles the rod 39 serves to return to the normal position this rod and the parts connected thereto.

The entire gear system for the transmission of the movement from the work spindle 3 to the cutter spindle 4 is mounted, as can be clearly seen from the drawing, in the centre bearing assembly 55 of the machine and is mainly enclosed in the gear casing 56 arranged in this bearing assembly and closed by a removable cover 57 (Fig. 5). The gear wheels can be inserted into the casing 56 and removed from the same through the openings 51, 52.

Figure 6:
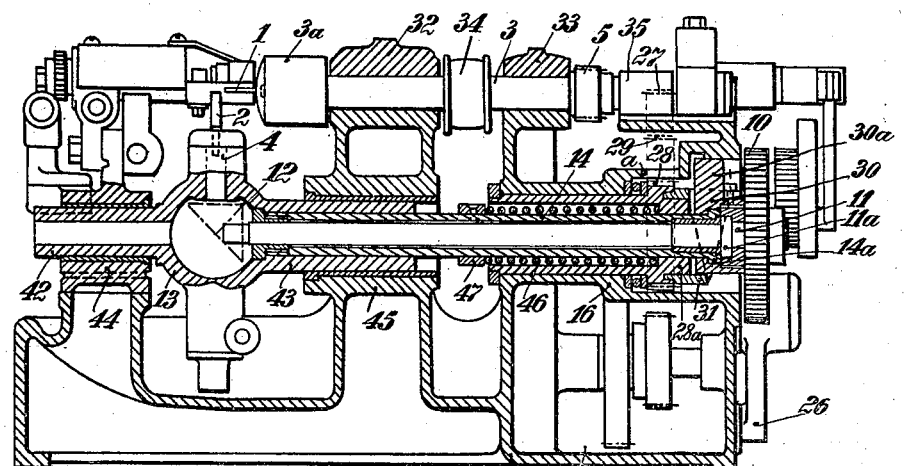
Figure 6 is a longitudinal section through the machine and through the bush of the cam.

The transmission of movement from the work spindle 3 to the cutter spindle 4 at the invariable ratio of transmission of for instance 1:16.5 is effected by the gears 5 and 6 (Figs. 3 and 4), 7 to 8 and further by the gear 9, connected with wheel 8 by its shaft to the gear 10 which is keyed by a feather upon the shaft 11 (Fig. 6). From shaft 11 the movement is transmitted by the bevel gears 12 to the cutter spindle 4.

The transmission of movement from the work spindle 3 to the control shaft $15^a$ is effected through gears 5, 6, 7, 8 and the intermediary gear $8^a$, and continued from gear 17 to 18, 19 to 20, 21 to 22 and from wheel 23 by an intermediary gear 25 mounted upon an adjustable angle lever 26 to the change gear 24 of the control shaft $15^a$. These transmission gears are also mounted in the centre bearing assembly 55 or in the gear casing 56 and they remain the same for all types of screws with the exception of the change gear 24.

The gear 27 keyed upon the control shaft $15^a$ transmits, by means of the intermediary gear 29, the movement from the control shaft $15^a$ to the gear 28 and to the bush $28^a$ connected with 28.

The reciprocating movement of the cutter 2 is controlled in this machine by making the housing 13 for the cutter which at the same time encloses the bevel gears 12 of the cutter spindle 4 and of the shaft 11, movable in a longitudinal direction. With this object in view cylindrical extensions 42, 43 of the housing are arranged in bearings 44, 45. In the extension 43 of the housing 13 is located one end of a hollow shaft 14 which encloses the shaft 11 and which bears at its right hand end the collar $14^a$. This collar $14^a$ and the collar $11^a$ of the shaft 11 are arranged in the head 30 which is itself guided by means of a wedge-shaped projection in a groove $30^a$ (Fig. 3) so that it does not participate in the rotary movement of the bush $28^a$ of the cam which surrounds the hollow shaft 14. The cam ring 31 is screwed upon the cam bush $28^a$. The cam 31 turned by the teeth of the bush $28^a$ moves the head 30 which in turn presses upon the collar $14^a$ and then upon the collar $11^a$ of the shaft 11 so that the hollow shaft 14 and with it the shaft 11 and the housing 13, the bevel gears 12, and the cutter spindle 4, are moved to the right. With the improved machine the two movements of the cutter shaft, namely, its rotary movement and its reciprocating movement, are derived from one and the same axis, viz from the common axis of the shaft 11 and of the hollow shaft 14 which surrounds shaft 11 so that the machine is considerably simplified. The ratio of transmission between the bush 28ª and the control shaft 15ª remains the same for all cases and is preferably 1:1.

The return to the normal position of the housing with the parts mounted in the same is effected by a spring 46 which is mounted between the hollow shaft 14 and the bush 28ª and which bears against an adjustable spring collar 47 fixed upon shaft 14.

With the aid of this machine screws of various lengths and pitches of thread can be produced without the necessity of altering the ratio of transmission for the gear system between the work spindle 3 and the cutter spindle 4.

The number of teeth of the cutter 2 remains also the same, but for the production of screws of smaller pitch, cutters of smaller diameter but with the same number of teeth are employed. For the production of screws with a pitch of 2.25 millimeters for example a cutter will be used which has a diameter of 14.5 millimeters, and for screws with a pitch of 1.2 millimeters a cutter with a diameter of 7.71 millimeters will be used which has, however, the same number of teeth as the first. By this alteration in the diameter of the cutter the space between the jaws of the chuck which hold the work piece or blank and the cutter is taken into account, and the jaws of the chuck are prevented from fouling the cutter when the screw is being cut. The calculation of the convenient diameter of cutter can be effected according to the following formula:

$$\phi = \frac{Z \times S}{3.14} \text{plus } k,$$

Z being the number of teeth of the cutter and S the pitch of the screw. $k$ is a factor which depends on the depth of the thread and which amounts for a pitch of 2.25 millimeters to 1.6 and for a pitch of 1.2 millimeters to 0.84.

The number of revolutions of the work spindle is determined by the desired length of thread of the screw to be produced with unchanged ratio of transmission between the work spindle and the cutter spindle and with unchanged number of teeth of the cutter, with the aid of the formula given above, and the corresponding change wheel (24) for the drive of the control shaft is inserted in the machine, also the corresponding stroke of cam is calculated and a cam ring 31 having said stroke is inserted by screwing it upon the cam bush 28ª. This stroke of the cam $e$ is calculated by means of the formula:

$$e = (Z \times n - n_1) \times S.$$

The apparent discrepancy of a 6/5 factor between this formula and that given above for the calculation of the speed of the work spindle is accounted for by the fact that one-sixth of the whole travel necessary for the cutting of a screw is occupied by the clamping and releasing of the work piece or blank, so that only five-sixths of the cam stroke is available for the actual cutting operation.

If for instance the number of cutter teeth is Z=18, the pitch S=2.25, the number of revolutions of the cutter shaft $n$=10 and that of the work spindle $n_1$=165, the stroke of the cam is found:

$$e = 33.75 \text{ millimeters}.$$

In this manner screws of varying pitch and of varying length can be produced on this machine without changing the ratio of transmission and the number of the cutter teeth and without having the machine run idle when screws with shorter screw threads have to be produced. In contradistinction thereto the machine of the usual type which was adapted only for the production of one type of screw, when being used for cutting screws with shorter threads, had to run idle for the length by which the thread of the screw being cut was shorter than the type for which the machine had been built, whereby serious loss of time was caused and the efficiency of the machine was decreased.

Having now particularly described and ascertained the nature of my said invention, I declare that what I claim is:—

1. An improved wood screw cutting machine comprising a working spindle bearing a chuck with jaws for holding the work piece, a cutter spindle bearing the cutter, a control shaft for controlling the opening and closing of said jaws, and transmission gear systems between both said spindles and said shaft, said gear systems being housed within one bearing assembly of the machine.

2. An improved wood screw cutting machine comprising a working spindle bearing a chuck with jaws for holding the work piece, a cutter spindle bearing the cutter, a control shaft for controlling the opening and closing of said jaws, transmission gear systems between both said spindles and shaft, said gear systems being housed within one bearing assembly of the machine, a housing enclosing said cutter shaft, and means for reciprocating said housing with said cutter shaft during its revolution.

3. An improved wood screw cutting machine comprising a working spindle bearing a chuck with jaws for holding the work piece, a cutter spindle bearing the cutter, a control shaft for controlling the opening and closing of said jaws, a driving shaft for said cutter shaft, bevel wheels connecting said drive shaft with said cutter shaft and transmission gear systems between said three shafts, said gear systems being housed within one bearing assembly of the machine, a housing enclosing said cutter shaft with said bevel wheels, a hollow shaft surrounding said drive shaft, said hollow shaft being connected with said housing, and means for reciprocating said hollow shaft and said housing with said drive shaft and cutter shaft.

4. An improved wood screw cutting machine comprising a working spindle bearing a chuck with jaws for holding the work piece, a cutter spindle bearing the cutter, a control shaft for controlling the opening and closing of said jaws, a driving shaft for said cutter shaft, bevel wheels connecting said drive shaft with said cutter shaft and transmission gear systems between said three shafts, said gear systems being housed within one bearing assembly of the machine, a housing enclosing said cutter shaft with said bevel wheels, a hollow shaft surrounding said drive shaft, said hollow shaft being connected with said housing, and a cam member for longitudinally displacing said hollow shaft and said housing with the parts surrounded by them.

5. An improved wood screw cutting machine comprising a working spindle bearing a chuck with jaws for holding the work piece, a cutter spindle bearing the cutter, a control shaft for controlling the opening and closing of said jaws, a driving shaft for said cutter shaft, bevel wheels connecting said drive shaft with said cutter shaft and transmission gear systems between said three shafts, said gear systems being housed within one bearing assembly of the machine, a housing enclosing said cutter shaft with said bevel wheels, a hollow shaft surrounding said drive shaft, said hollow shaft being connected with said housing, a cam member for longitudinally displacing said hollow shaft and said housing with the parts surrounded by them, and means for driving said cam member from said control shaft.

In testimony whereof I have hereunto set my hand in presence of two subscribing witnesses.

MARTIN GILGENBERG.

Witnesses:
BERNARD FRIEBERG,
RUDOLF HEINRICKS.